M. MICHELSEN.
HORSESHOE.
APPLICATION FILED NOV. 15, 1920.

1,416,658.

Patented May 16, 1922.
2 SHEETS—SHEET 1.

R. A. Thomas
WITNESS

M. Michelsen INVENTOR
BY Victor J. Evans
ATTORNEY

M. MICHELSEN.
HORSESHOE.
APPLICATION FILED NOV. 15, 1920.

1,416,658.

Patented May 16, 1922.
2 SHEETS—SHEET 2.

R. C. Thomas
WITNESS

M. Michelsen  INVENTOR
BY Victor J. Evans
ATTORNEY

UNITED STATES PATENT OFFICE.

MICHAEL MICHELSEN, OF NEWPORT NEWS, VIRGINIA.

HORSESHOE.

1,416,658.         Specification of Letters Patent.         Patented May 16, 1922.

Application filed November 15, 1920. Serial No. 424,273.

*To all whom it may concern:*

Be it known that I, MICHAEL MICHELSEN, a subject of the King of Norway, residing at Newport News, in the county of Warwick and State of Virginia, have invented new and useful Improvements in Horseshoes, of which the following is a specification.

My invention has reference to expansible horseshoes.

The primary object of the invention is the production of a horseshoe which may be attached to a horse's hoof and securely sustained thereon without the employment of the usual nails.

A further object is the production of an expansible horseshoe which may be operatively positioned upon different sized hoofs.

Other objects and advantages will present themselves as the nature of the invention is better understood, reference being had to the drawings which accompany and which form part of this application.

In the drawings:—

Figure 1:
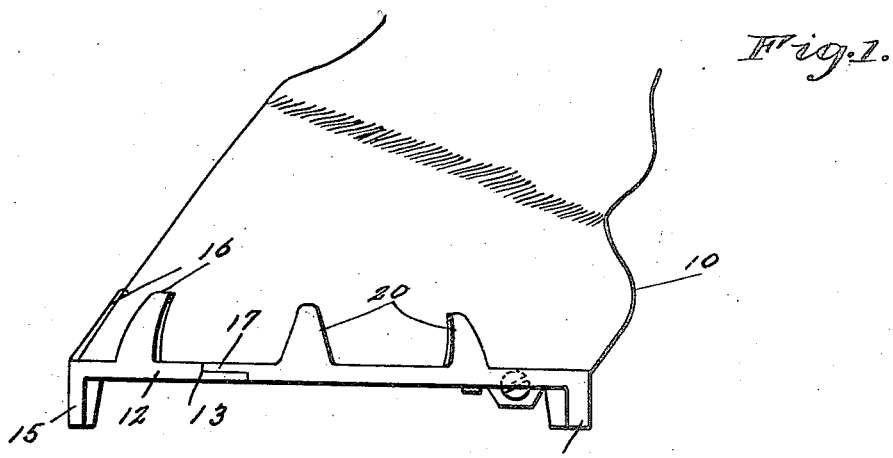
Figure 1 is a side elevation illustrating the application of the improvement.
Figure 2:
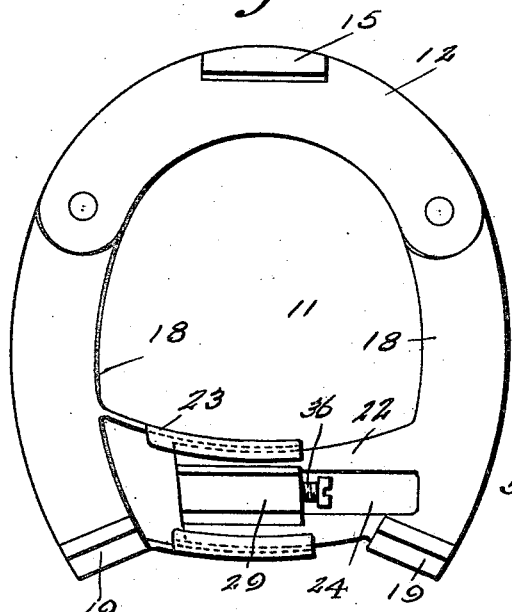
Fig. 2 is a bottom plan view of the improvement.
Figure 4:
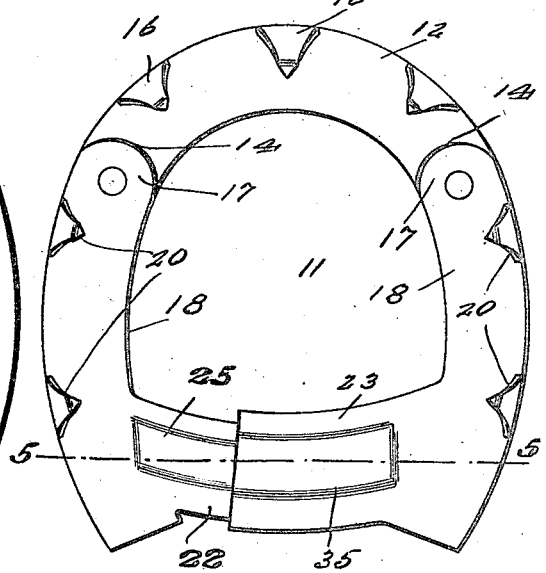
Fig. 4 is a top plan view of the improvement.
Figure 3:
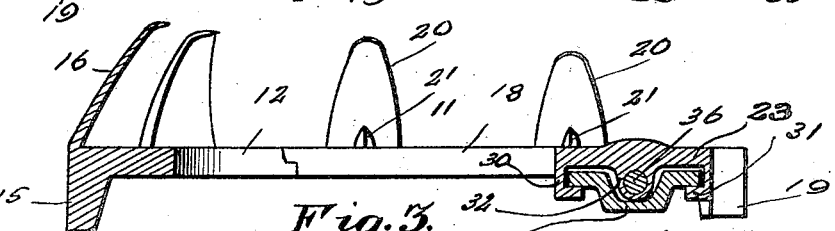
Fig. 3 is an approximately central vertical longitudinal sectional view through the improvement.
Figure 5:
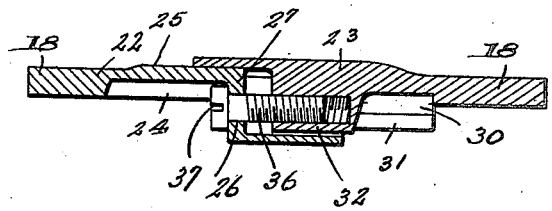
Fig. 5 is a sectional view approximately on the line 5—5 of Fig. 4.
Figure 6:
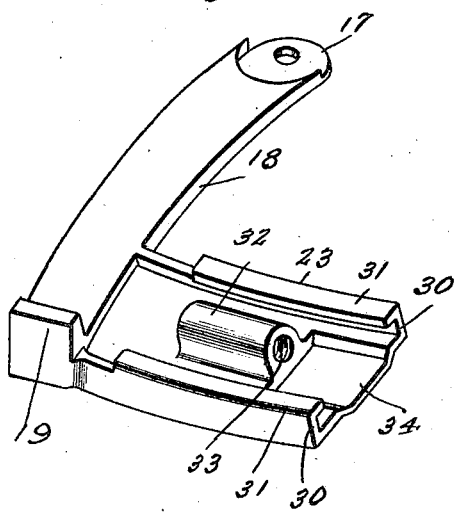
Fig. 6 is a perspective view of the flanged end of one of the pivoted side members of the improvement.
Figure 7:
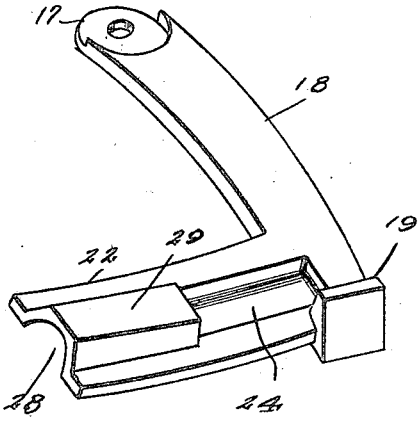
Fig. 7 is a similar view of the flanged end of the other pivoted side member.

In Fig. 1, the numeral 10 indicates the hoof of a horse to which the improvement is attached.

The horseshoe is broadly indicated by the numeral 11, and includes a toe portion 12 which is round or arched in plan and which has its ends also rounded, and reduced on the upper face of the toe, as at 13. The inner walls provided by the reduced portions 13 are concaved, as at 14. The toe, at the outer center thereof has a depending calk 15, and has on its upper face, at its outer edge inwardly arched fingers 16. The reduced ends of the toe portion provide tongues which receive thereon and have pivoted thereto the inner reduced ends or tongues 17 of the side members 18 of the horseshoe. The sides, at their ends or outer corners have depending calks 19 and on their outer edges and upper faces the said sides are formed with inwardly rounded fingers 20. The upper faces of the side members, centrally on the inside of each of the spaced fingers 20 have upstanding substantially sharp-edged wedge-shaped lugs 21. The lugs gradually decrease in height from their connection with the fingers to the body of the side members.

Each of the side members 18 has at its outer end an inwardly directed flange, the flanges, for distinction, being indicated by the numerals 22 and 23 respectively. The flanges are struck at a slight curvature, and the flange 23 is of a greater width than the flange 22. The flange 22 has it lower face formed with a depression or channel 24, that extends from its outer end a distance approximately equaling one-half of the length of the said flange 22. The channel provides the upper face of the flange with a central rib 25, and the wall 27 at the inner end of the channel is formed with a centrally-rounded opening 26. The upper face of the flange 22, from the wall 27, is formed with a longitudinal depression 28, and the lower face of the said flange, opposite the said depression, is formed with a rib 29. The flange 22 is really in the nature of a tongue, and the flange 23 has its edges formed with upstanding flanges 30 that have their edges flanged inwardly, as at 31, to provide a grooved portion for the reception of the tongue provided by the flange 22. The flange 23, between its sides, is depressed for a depth corresponding to the thickness of the flange 22, and in the said depressed portion there is approximately centrally formed a cross-sectionally rounded lug 32 that has a threaded bore 33 entering from the outer end thereof. The flange 23, outward of the lug, is centrally formed with a depression 34 to receive therein the rib 25 of the flange 22, and the upper face of the flange 23 is centrally formed with an upstanding portion in the nature of a rib 35.

Designed to be passed through the opening 26 in the wall 27 of the flange 22 is the threaded shank of a bolt 36. The bolt has its head kerfed as at 37. The bolt is designed to engage in the threaded bore of the lug 32, and by adjusting the bolt the side members of the horseshoe may be moved toward each other to effectively bind the shoe on the hoof 10. The fingers 20 effectively contact with the sides of the hoof, and preferably the ends of the substantially V-shaped fingers 16 and 20 are bent or sharpened inwardly, so that these portions will embed themselves in the hoof. The lugs 21, and the ribs 25 and 35 on the upper faces of the flanges 22 and 23, will engage with the under surface of the hoof 10, so that accidental removal of the shoe from the hoof will be effectively prevented.

The improvement being of an expansible nature is susceptible for employment on varying sizes of horses' hoofs, and it is thought that the foregoing description, when taken in connection with the drawings will fully set forth the construction, manner of attachment, and advantages of the improvement without further detail description.

Having thus described the invention, what I claim is:—

1. In an expansible horseshoe, a toe portion which is arched in plan, and side portions pivoted to the ends of the toe portion, upwardly-directed inwardly-curved fingers on the edges of the toe and side portions, inwardly directed flanges at the outer ends of the side portions, one of said flanges having its edges inturned to receive therein the flange of the second side portion, a lug between the inturned portions of the first-mentioned flange, the second-mentioned flange having a channeled portion to receive the lug, and means between said channeled portion and said lug for adjustably locking the flanges connected.

2. In an expansible horseshoe, a toe portion which is arched in plan, and side portions pivoted to the ends of the toe portion, upwardly-directed inwardly-curved fingers on the edges of the toe and side portions and said fingers having their upper ends sharpened, lugs on the side portions inward of the fingers thereof, flanges on the outer ends of the side portions, one having its under face depressed and its edges inturned, a lug between the inturned portions having a threaded bore, the flange of the second side portion designed to be received on the under face of the first-mentioned flange between the inturned edges thereof, said second flange having its under face channeled, the said channel terminating in a straight wall which is provided with an opening, the upper face of the said second flange being channeled outwardly from the said opening and provided with a rib below the opening, the upper face of this second flange adapted to receive the last mentioned lug, and a headed screw passing through the said opening in the wall of the second flange and entering the threaded bore of the said lug on the first-mentioned flange for adjustably connecting the flanges.

In testimony whereof I affix my signature.

MICHAEL MICHELSEN.